United States Patent [19]

Kumagai

[11] Patent Number: 5,086,482
[45] Date of Patent: Feb. 4, 1992

[54] IMAGE PROCESSING METHOD
[75] Inventor: Ryohei Kumagai, Tokyo, Japan
[73] Assignee: Ezel, Inc., Tokyo, Japan
[21] Appl. No.: 301,350
[22] Filed: Jan. 25, 1989
[51] Int. Cl.⁵ .............................................. G06F 3/14
[52] U.S. Cl. ..................................... 382/25; 395/142
[58] Field of Search .................... 364/518, 521; 382/25

[56] References Cited

U.S. PATENT DOCUMENTS

| | | | |
|---|---|---|---|
| 4,199,815 | 4/1980 | Kyte et al. | 340/747 X |
| 4,392,130 | 7/1983 | Lundström et al. | |
| 4,620,287 | 10/1986 | Yam | 364/521 X |
| 4,686,635 | 8/1987 | Schrieber | 364/518 X |
| 4,791,581 | 12/1988 | Ohba | 364/521 |
| 4,829,456 | 5/1989 | Joonishi et al. | 364/521 X |
| 4,835,722 | 5/1989 | Clarke et al. | 364/521 X |

OTHER PUBLICATIONS

Toussaint GT and Avis D, "One Covex Hull Algorithm for Polygons and Its Application to Triangulation Problems," Pattern Recognition, vol. 15, No. 1, pp. 23-29, 1982.
Shin Sy and Woo TC, "Finding the Convex Hull of a Simple Polygon in Linear Time," Pattern Recognition, vol. 19, No. 6, pp. 453-458, 1986.

Primary Examiner—David L. Clark
Attorney, Agent, or Firm—Cushman, Darby & Cushman

[57] ABSTRACT

An image processing method for generating a convex hull of a configuration in a digital image. Top points of the convex hull are selected. A reference line connecting the top points is defined. For each area between two adjacent top points, continuous pixels are selected from one top point toward the other so that each pixel is the nearest to the referfence line as well as between the reference line and a contour of the configuration. Distances from pixels to the reference line are calculated from chain codes.

7 Claims, 3 Drawing Sheets

IMAGE PROCESSING METHOD

FIELD OF THE INVENTION the present invention relates to an image processing method, particularly to an image processing method for generating a convex hull of a digital image.

BACKGROUND OF THE INVENTION

In the case of recognizing a hand-written character "R" as shown in FIG. 1, the concavities C1 and C2 and the hole H will be the key points for recognition. It will be understood that the concavities, convexities and holes are important characteristics of a configuration. For extracting these characteristics, for example, a convex hull of a configuration is generated and the original configuration is subtracted from the convex hull. However, in the digital image, the convex hull is not always precisely generated. In the digital image, the convex hull is generated by connecting top points successively with lines and by filling the inside of the lines. However, the line in the digital image differs according to the algorithm of line drawing. Usually one dot deviation may easily happen because an analog line does not always pass through the center of a digital pixel. When a pixel is selected, as a pixel on the digital line, from outside the pixel of the analog convex hull, the configuration generated by the subtraction of the original image from the convex hull does not represent an identifying characteristic itself. Usually a digital line is drawn by a graphic processor, so the digital line is drawn according to the algorithm of the processor.

When the convex hull is not drawn precisely, the analysis after the above subtraction cannot be well performed.

SUMMARY OF THE INVENTION

Therefore, the present invention has an object to provide an image processing method for generating a convex hull useful for the analysis of concavities, convexities and holes.

According to the present invention, between two adjacent top points in the convex hull, a pixel inside of and with nearest distance from the line connecting the top points is successively selected, from one top point to the other.

DETAILED DESCRIPTION OF THE PREFERRED EMBODIMENT

Exemplary preferred embodiments of the image processing method according to the present invention will be described in detail hereinafter.

Figure 1:
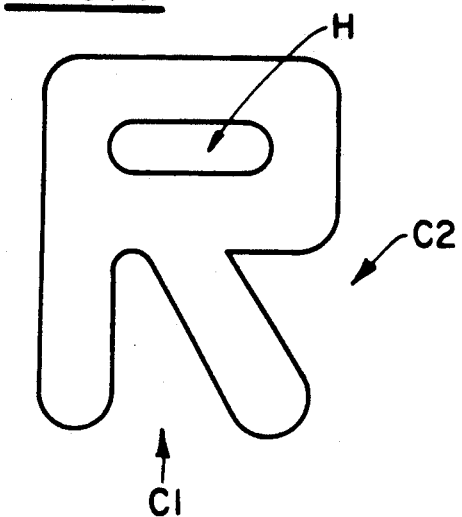
FIG. 1 shows a hand-written character "R"
Figure 2:
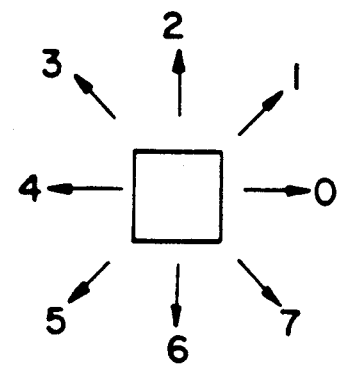
FIG. 2 is a diagram showing chain code.

As shown in FIG. 2, a pixel in a digital image has 8 peripheral pixels, so there are 8 directions from one pixel to an adjacent pixel. These directions are represented by Freeman's chain codes, from "0" to "7". A chain code string represents a continuous train of pixels as well as the deviation of each pixel from a line.

Figure 3:
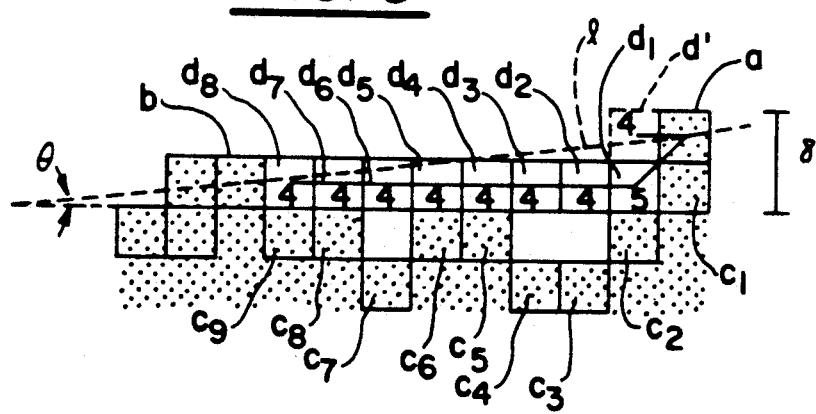
FIG. 3 is a diagram showing a concavity of a configuration.
Figure 5:
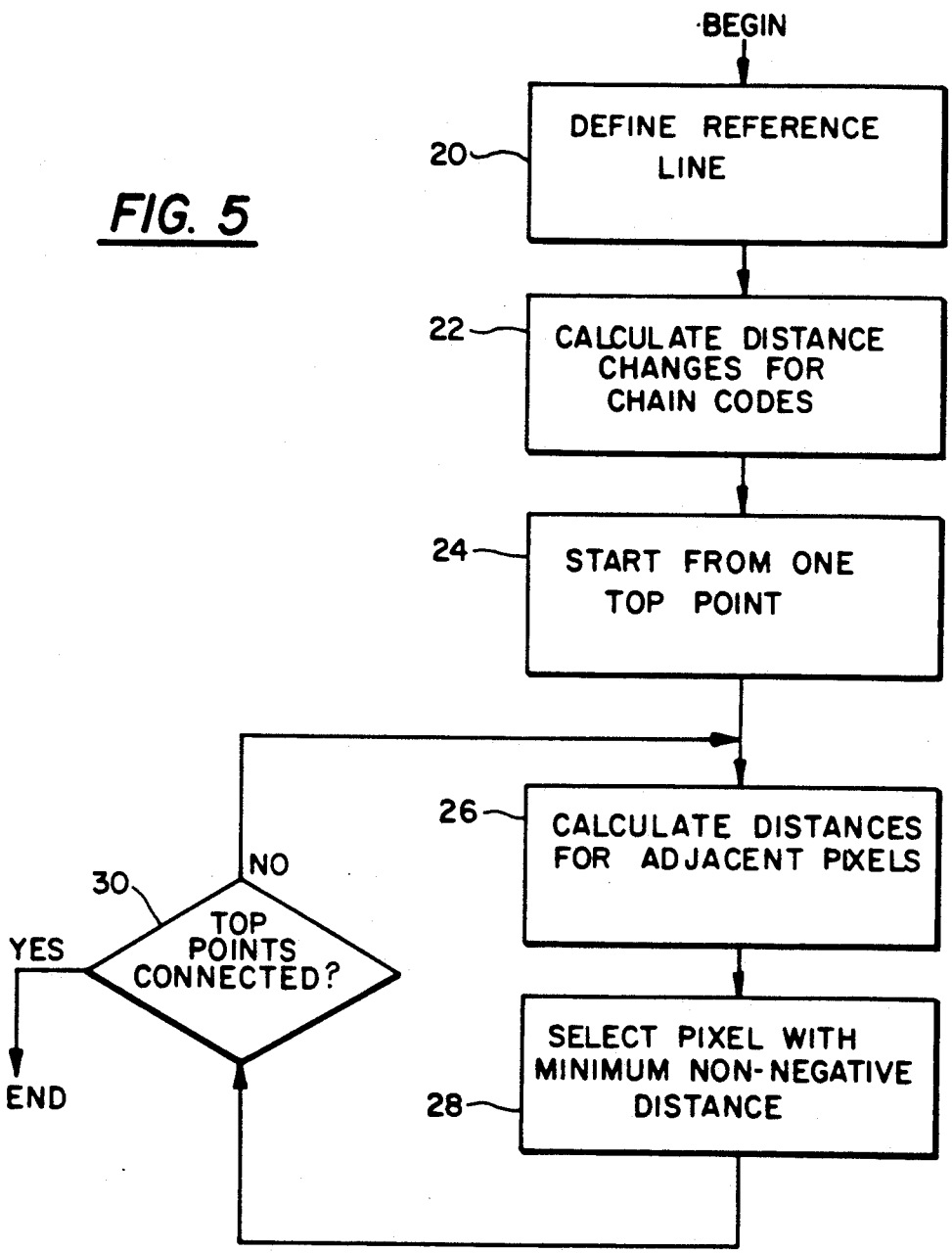
FIG. 5 shows a flow chart of a method in accordance with the present invention.

FIG. 3 shows a concavity of a configuration consisting of top points a and b on the convex hull and boundary pixels from C1 to C9. A reference line 1 is drawn for representing the analog convex hull (see also item 20 of FIG. 5). When the digital convex hull is generated, pixels should be put inside the line 1. The pixels to be selected should also be the nearest to the line 1. Such pixels are selected continuously and successively from one top point, for example the point a, to the other (see also items 24 and 30 of FIG. 5). Pixel order may be clockwise or anticlockwise. The anticlockwise order is applied in the following description.

A chain code to be given to the top point a is "4" or "5" and cannot be other codes. The pixel d' indicated by "4" is nearer than the pixel d1 indicated by "5" to the line 1. However, the pixel d' is outside of the line 1. Therefore, the pixel d1 is selected as a pixel adjacent to the top point a for generating the convex hull. In the same manner, pixels from d2 to d8 are continuously and successively selected toward the top point b. The line 1 is defined by the coordinates of the top points a and b. The distance between the line 1 and each pixel of d1 to d8 is defend by the chain code train given to the pixels from d1 to d8. The inclination angle $\theta$ of the line 1 is defined by the coordinates of the top points a and b. The distance between the line 1 and each pixel of d1 to d8 is defined by the inclination angle $\theta$ and the chain code train (see also items 26 of FIG. 5). The distance $\Delta$ between the line 1 and the pixel d1 is calculated when the chain code is "5" as follows:

$$\Delta = (\delta/\sin 45°)\sin(45° - \theta)$$
$$= -\delta(\sin\theta - \cos\theta)$$

where, $\delta$: Width of a pixel as well as distance between vertically or horizontally adjacent pixels;

$\Delta$ is negative when the pixel is outside of the line 1.

The value $\Delta$ for the pixels after the pixel d1 gives distance increase or decrease. When the value $\Delta$ for d1 is $\Delta$d1 and for d2 is $\Delta$d2, the distance between the line and the pixel d2 is ($\Delta$d1+$\Delta$d2). The value $\Delta$ for each chain code may be calculated beforehand (see also item 22 of FIG. 5). The pixels are selected so that the distance is minimum as far as the distance does not become negative, with tracing selected pixels (see also item 28 of FIG. 5).

Figure 4:
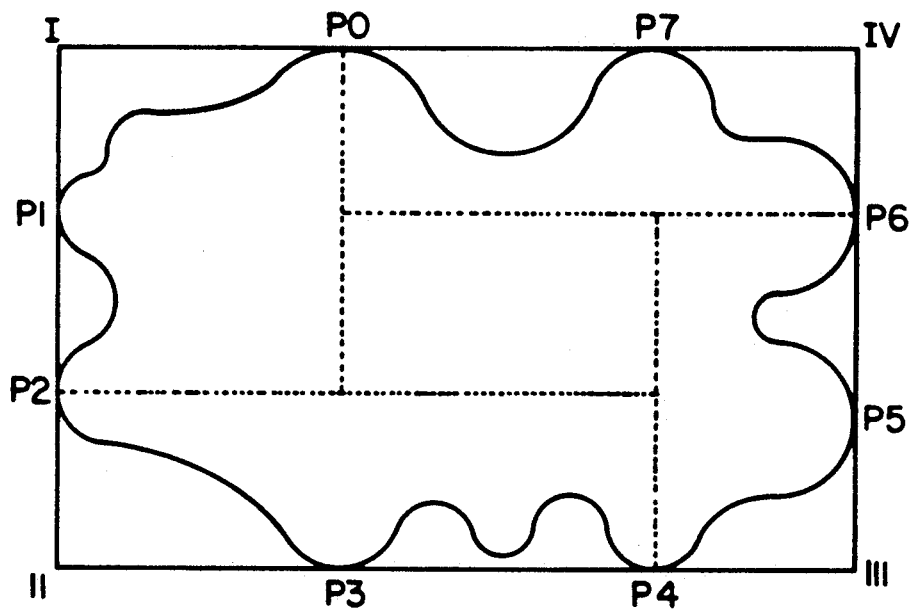
FIG. 4 shows 4 quadrants of an image.

A configuration can be divided into four quadrants, from the first to fourth. When upper end pixels of the configuration in FIG. 4 are designated P0 and P7, lower end pixels P3 and P4, left end pixels P1 and P2 and right end pixels P5 and P6, in each of the areas, from P0 to P2, from P2 to P4, from P4 to P6, and from P6 to P0, the distance increase or decrease is defined only by the chain code. The area P0 to P2, P2 to P4, P4 to P6 and P6 to P0 are now called the first, second, third and fourth quadrant, respectively. The distance increase or decrease in each quadrant is shown in Table 1. In Table 1, the inclination $\theta$ of the line is measured anticlockwisely from a horizontal line and $\delta$ designates the distance between horizontally or vertically adjacent pixels.

TABLE 1

| Chain Code | Quadrant I, IV | Quadrant II, III |
|---|---|---|
| 0 | $\delta\sin\theta$ | $-\delta\sin\theta$ |
| 1 | $\delta(\sin\theta - \cos\theta)$ | $-\delta(\sin\theta - \cos\theta)$ |

TABLE 1-continued

| Chain Code | Quadrant I, IV | Quadrant II, III |
| --- | --- | --- |
| 2 | $-\delta \cos\theta$ | $\delta \cos\theta$ |
| 3 | $-\delta(\sin\theta + \cos\theta)$ | $\delta(\sin\theta + \cos\theta)$ |
| 4 | $-\delta \sin\theta$ | $\delta \sin\theta$ |
| 5 | $-\delta(\sin\theta - \cos\theta)$ | $\delta(\sin\theta - \cos\theta)$ |
| 6 | $\delta \cos\theta$ | $-\delta \cos\theta$ |
| 7 | $\delta(\sin\theta + \cos\theta)$ | $-\delta(\sin\theta + \cos\theta)$ |

In FIG. 3, distances from the line 1 to pixels of d1 to d8 are calculated as follows:

$d1: -\delta(\sin\theta - \cos\theta)$ $d2: -\delta(\sin\theta - \cos\theta) - \delta\sin\theta$ $d3: -\delta(\sin\theta - \cos\theta) - 2\delta\sin\theta$ $d4: -\delta(\sin\theta - \cos\theta) - 3\delta\sin\theta$ $d5: -\delta(\sin\theta - \cos\theta) - 4\delta\sin\theta$ $d6: -\delta(\sin\theta - \cos\theta) - 5\delta\sin\theta$ $d7: -\delta(\sin\theta - \cos\theta) - 6\delta\sin\theta$ $d8: -\delta(\sin\theta - \cos\theta) - 7\delta\sin\theta$ The distance increase or decrease in Table 1 can be easily calculated beforehand when $\theta$ is determined. Therefore, the trigonometric calculation is not necessary for each pixel.

What is claimed is:

1. An image processing method for generating a portion of a convex hull of a configuration comprising the steps of:
    selecting two adjacent top points in a configuration in an image;
    defining a reference line connecting the two top points;
    selecting one top point as a starting point;
    selecting a series of pixels, each being as near to the reference line as possible while being positioned between the reference line and a contour of the configuration, the selected pixels extending continuously from the start point to the other top point.

2. An image processing method as in claim 1, wherein the step of selecting a series of pixels, each being as near to the reference line as possible includes a step of calculating a distance between a pixel and the reference line from a chain code which is given to each pixel.

3. An image processing method as in claim 2, wherein the distance is calculated according to the changes of distance which occurs when moving from one pixel to an adjacent pixel, the changes being determined from the chain code.

4. An image processing method as in claim 3, wherein a table of the changes of distance is prepared for calculating the distance of a pixel to the analog line.

5. An image processing method for selecting a series of pixels connecting two top points of a contour in an image comprising steps of:
    defining direction codes uniquely designating direction from any pixel to any adjacent pixel;
    defining a reference line connecting the two top points in terms of the coordinates of the top points;
    selecting one of the top points as a starting pint;
    for each pixel adjacent to the starting point, computing the adjacent pixel's distance to the reference line from its direction code;
    selecting, as a point in the digital line, the pixel adjacent to the starting point located on the same side of the reference line as the contour and having the minimum distance to the reference line; and
    selecting as the digital line a series of pixels, each being adjacent to a previous pixel in the series, each being the one adjacent pixel which is located on the same side of the analog line as the contour and which has the minimum distance to the analog line.

6. A method as in claim 5 further comprising the steps of
    determining the incremental change in distance between a i) a first pixel and the analog line and ii) an adjacent pixel and the analog line in terms of the direction code of the adjacent pixel;
    determining the distance from a pixel to the analog line from the incremental distances of a series of pixels connecting the pixel under evaluation to a top point based on a chain code designating the series of pixels.

7. An image processing method as in claim 2, wherein step of calculating a distance between a pixel and the reference line includes steps of:
    determining in which of four quadrants the pixel is included, each quadrant corresponding generally to one of the upper, left, lower and right sides of the configuration; and
    calculating distance in accordance with a the quadrant which the pixel is included.

* * * * *